US007831974B2

(12) United States Patent
Huston et al.

(10) Patent No.: US 7,831,974 B2
(45) Date of Patent: Nov. 9, 2010

(54) METHOD AND APPARATUS FOR SERIALIZED MUTUAL EXCLUSION (75) Inventors: Larry B. Huston, Wexford, PA (US); Charles E. Narad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1227 days.

(21) Appl. No.: 10/293,908

(22) Filed: Nov. 12, 2002

(65) Prior Publication Data

US 2004/0093602 A1    May 13, 2004

(51) Int. Cl.
*G06F 9/46* (2006.01)
*G06F 12/00* (2006.01)

(52) U.S. Cl. ............................ 718/104; 710/244
(58) Field of Classification Search ................ 718/104, 718/108, 102; 709/102; 710/200, 244
See application file for complete search history.

(56) References Cited

U.S. PATENT DOCUMENTS

| 4,748,560 | A | 5/1988 | Kataoka |
| 5,053,946 | A | 10/1991 | Jain |
| 5,072,373 | A | 12/1991 | Dann |
| 5,155,725 | A | 10/1992 | Khalil |
| 5,175,851 | A | 12/1992 | Johnson et al. |
| 5,247,684 | A | 9/1993 | Tavares et al. |
| 5,301,333 | A | 4/1994 | Lee |
| 5,307,487 | A | 4/1994 | Tavares et al. |
| 5,377,353 | A | 12/1994 | Yamaguchi |
| 5,515,537 | A * | 5/1996 | Tavares et al. ............. 710/244 |
| 5,586,331 | A * | 12/1996 | Levenstein ................ 710/200 |
| 5,630,136 | A * | 5/1997 | Davidson et al. ........... 718/106 |
| 5,664,092 | A * | 9/1997 | Waites ...................... 714/25 |
| 5,842,003 | A | 11/1998 | Holmes et al. |
| 5,944,788 | A | 8/1999 | Krantz et al. |
| 5,956,712 | A | 9/1999 | Bennett et al. |
| 5,983,266 | A | 11/1999 | Tadman et al. |
| 5,999,969 | A | 12/1999 | Holmes et al. |
| 6,041,383 | A | 3/2000 | Jeffords et al. |
| 6,105,049 | A * | 8/2000 | Govindaraju et al. ....... 718/102 |
| 6,269,464 | B1 * | 7/2001 | Boussina et al. ............. 714/752 |
| 6,314,563 | B1 * | 11/2001 | Agesen et al. ............. 717/108 |
| 6,385,613 | B1 | 5/2002 | Grewell et al. |
| 6,502,136 | B1 | 12/2002 | Higuchi et al. |

(Continued)

FOREIGN PATENT DOCUMENTS

WO    WO 00/36491    6/2000

(Continued)

OTHER PUBLICATIONS

Jang Seung-Ju, et al., "Spin-Block Synchronization Algorithm in the Shared Memory Multiprocessor System", *Operating Systems Review (SIGOPS)*, 28(4):15-30, Oct. 1994.

(Continued)

*Primary Examiner*—Meng-Ai An
*Assistant Examiner*—Camquy Truong
(74) *Attorney, Agent, or Firm*—Blakely, Sokoloff, Taylor & Zafman LLP (57) ABSTRACT

A mechanism that associates a mutual exclusion lock with a shared data item and provides ownership of the mutual exclusion lock to multiple execution threads that execute code operating on the shared data item in a sequential order.

42 Claims, 9 Drawing Sheets

U.S. PATENT DOCUMENTS

| | | | |
|---|---|---|---|
| 6,629,175 B1 * | 9/2003 | Manning et al. ............ | 710/200 |
| 6,658,513 B1 * | 12/2003 | Boonie et al. ............... | 710/200 |
| 6,820,263 B1 * | 11/2004 | Klappholz .................. | 718/108 |
| 6,907,491 B2 * | 6/2005 | Moss ......................... | 710/309 |
| 7,315,388 B2 | 1/2008 | Fujiwara et al. | |
| 7,383,354 B2 | 6/2008 | Sultan et al. | |
| 7,421,430 B2 | 9/2008 | Meng | |
| 7,421,693 B1 * | 9/2008 | Joffe et al. ................. | 718/104 |
| 7,596,563 B1 | 9/2009 | Dickson | |
| 2002/0018481 A1 * | 2/2002 | Mor et al. ................... | 370/403 |
| 2002/0078123 A1 * | 6/2002 | Latour ........................ | 709/104 |

FOREIGN PATENT DOCUMENTS

WO      WO 02/39260      5/2002

OTHER PUBLICATIONS

Michel Raynal, "A simple taxonomy for distributed mutual exclusion algorithms", *Operating Systems Review* (*SIGOPS*), 25(2):47-51, Apr. 1991.

Addison Wesley Longman, "The Art of Computer Programming", vol. 1/Fundamental Algorithms, 1997, Library of Congress Cataloging-in-Publication Data.

* cited by examiner

Enter S_mutex(a) ("Sa")

Execute code which accesses shared data "a"

Exit S_mutex(a)

Execute multi-thread safe code

Enter S_mutex(b) ("Sb")

Execute code which accesses shared data "b"

Exit S_mutex(b)

METHOD AND APPARATUS FOR SERIALIZED MUTUAL EXCLUSION

BACKGROUND

Many applications that use multiple threads of execution that share data in a common memory or communicate through a common memory employ some type of mechanism to ensure data consistency. One type of mechanism provides for mutual exclusion, that is, it makes use of a "mutual exclusion lock" to ensure that only one of the execution threads can enter a critical region in which the shared data is manipulated. If more than two threads of execution are sharing a location, multiple threads may attempt to obtain ownership of the mutual exclusion lock simultaneously. Under such conditions, the order in which the threads obtain the mutual exclusion lock ownership is not guaranteed.

When multiple threads of execution on one or more processors are sharing data, a mutual exclusion lock ("mutex") is used to provide ownership of the shared data to only one agent at a time. The use of a mutex allows the thread that holds the mutex to make one or more modifications to the contents of a shared record, or a read-modify-write to update the contents, while maintaining consistency within that record.

In general, a mutex is implemented as a location in memory, which is used to signal both intent to own, and ownership of, another region protected by the mutex. There are many techniques, using software or a combination or software and hardware, to implement the acts of obtaining (entering) and releasing (exiting) the mutex. A thread of execution which enters a critical region of code in which shared data is modified is preceded by a mutex_enter( ) operation and is followed by a mutex_exit( ) operation. Techniques for implementing mutex_enter( ) and mutex_exit( ) operations are well known.

In some applications, the use of such competitive mutual exclusion locks is insufficient to control access to the shared data due to serialization constraints. Thus, other techniques to enforce order are used.

For example, in some networking applications, order is maintained by requiring that all cells or packets traveling between a particular pair of endpoints be handled by the same process or thread, or through the use of hardware pipelining. The former limits the throughput for any pair of endpoints to the performance of the single thread, thus parallelism can only be achieved among flows from unrelated pairs of endpoints, while strict order is maintained within any end-to-end flow. The latter can achieve higher throughput but is limited in flexibility and performance by how well tasks partition into fixed pipeline stages, as well as the degree to which communication between those stages can be minimized. Other network applications maintain order through the use of sequence numbers associated with each cell or packet, but some network protocols do not support the use of sequence numbers.

DETAILED DESCRIPTION

Figure 1:
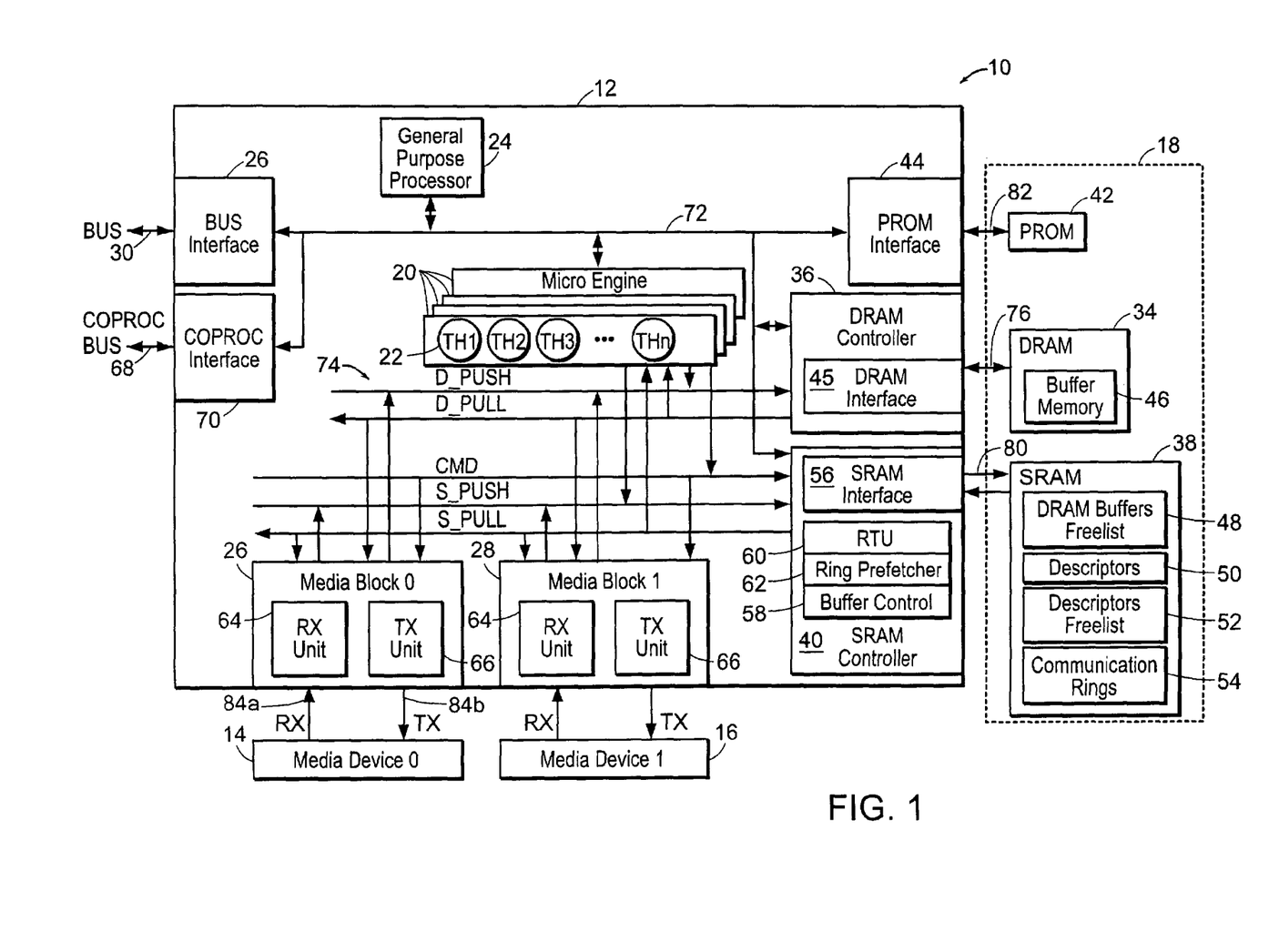
FIG. 1 is a block diagram of a communication system employing a processor having multi-threaded microengines to support multiple threads of execution.

Referring to FIG. 1, a communication system 10 includes a processor 12 coupled to one or more I/O devices, for example, network devices 14 and 16, as well as a memory system 18. The processor 12 is multi-threaded processor and, as such, is especially useful for tasks that can be broken into parallel subtasks or functions. In one embodiment, as shown in the figure, the processor 12 includes multiple microengines 20, each with multiple hardware controlled program threads 22 that can be simultaneously active and independently work on a task. Each of the microengines 20 is connected to and can communicate with adjacent microengines.

The processor 12 also includes a general purpose processor (GPP) 24 that assists in loading microcode control for the microengines 20 and performs other general purpose computer type functions such as handling protocols and exceptions, as well as provides support for higher level processing tasks that cannot be handled by the microengines. The GPP 24 has an operating system through which it can call functions to operate on the microengines 20. The GPP 24 can use any supported operating system, preferably a real-time operating system.

The microengines 20 each operate with shared resources including the memory system 18, a bus interface 26, and one or more media blocks 26 and 28. The bus interface 26 provides an interface to an external bus 30, e.g., the PCI bus. The media blocks 26, 28 are responsible for controlling and interfacing the processor 12 to the network devices 14, 16, respectively. The memory system 18 includes a Dynamic Random Access Memory (DRAM) 34, which is accessed using a DRAM controller 36, and a Static Random Access Memory (SRAM) 38, which is accessed using an SRAM controller 40. The memory system 19 also includes a nonvolatile memory 42 such as a PROM and corresponding interface 44 to support boot operations. The DRAM 34 and DRAM controller 36 are typically used for storing large volumes of data, e.g., payloads from network packets. The DRAM controller 36 includes a DRAM interface 45 for accessing buffer memory 46 within the DRAM 34. The buffer memory is used to store packet data, either payloads or complete packets. The SRAM 38 and SRAM controller 40 are used in a networking implementation for low latency, fast access tasks, e.g., accessing look-up tables, time-critical data and instructions for the processor 24, and so forth. The SRAM 38 stores DRAM buffer freelists (lists of pointers to available buffers in the buffer memory 46) 48, descriptors 50, descriptor freelists 52 and communication rings 54 for passing information, e.g., descriptor pointers, between the processor's resources, such as the microengine threads 22, GPP 24 and media blocks. The SRAM controller 40 includes an SRAM interface 56 that is used for accessing data stored in the SRAM 38, and buffer control logic 58 to support allocation of the DRAM buffers represented in the freelist 48 to requesting resources. Also included in the SRAM controller 40 is a Ring Translation Unit 60, which, in conjunction with a ring prefetcher 62, is used by the resources to access the rings 54. The microengines 20 and the GPP 24 can execute memory reference instructions to either the DRAM controller 36 or the SRAM controller 40.

The devices 14 and 16 can be any network devices capable of transmitting and/or receiving network traffic data, such as framing/media access control devices, e.g., for connecting to 10/100 BaseT Ethernet, Gigabit Ethernet, ATM or other types of networks, or devices for connecting to a switch fabric. The media blocks 26, 28 therefore support one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The media blocks 26, 28 each include a separate receive (RX) unit 64 and transmit (TX) 66, each being separately configurable for a particular interface supported by the processor 12.

Other devices, such as a host computer and/or bus peripherals (not shown), which may be coupled to the bus 30 controlled by the bus interface 26, or a coprocessor (also not shown), which may coupled to a coprocessor bus 68 controlled by a coprocessor interface 70, are also serviced by the processor 12.

In general, as a network processor, the processor 12 can interface to any type of communication device or interface that receives/sends large amounts of data. The processor 12 functioning as a network processor could receive units of packet data from a network device like network device 14 and process those units of packet data in a parallel manner, as will be described. The unit of packet data could include an entire network packet (e.g., Ethernet packet) or a portion of such a packet, e.g., a cell or packet segment.

Each of the functional units 20, 24, 26, 36, 40, 44 and 70 of the processor 12 is coupled to a first bus structure 72. The functional units 20, 26, 28, 36, 40 are coupled to a second bus structure 74. Memory busses 78, 80 couple the memory controllers 36 and 40, respectively, to respective memory units DRAM 34 and SRAM 38 of the memory system 18. Memory bus 82 couples the PROM interface 44 to the PROM 42 of the memory system 18. The media blocks 26, 28 each are coupled to their respective network devices 14 and 16 via separate I/O bus lines 84a and 84b, respectively.

Although not shown in detail, each microengine 20 includes a write transfer register file and a read transfer register file. The write transfer register file stores data to be written to a resource external to the microengine (for example, the DRAM memory or SRAM memory). The read transfer register file is used for storing return data from a resource external to the microengine 20.

Figure 2:
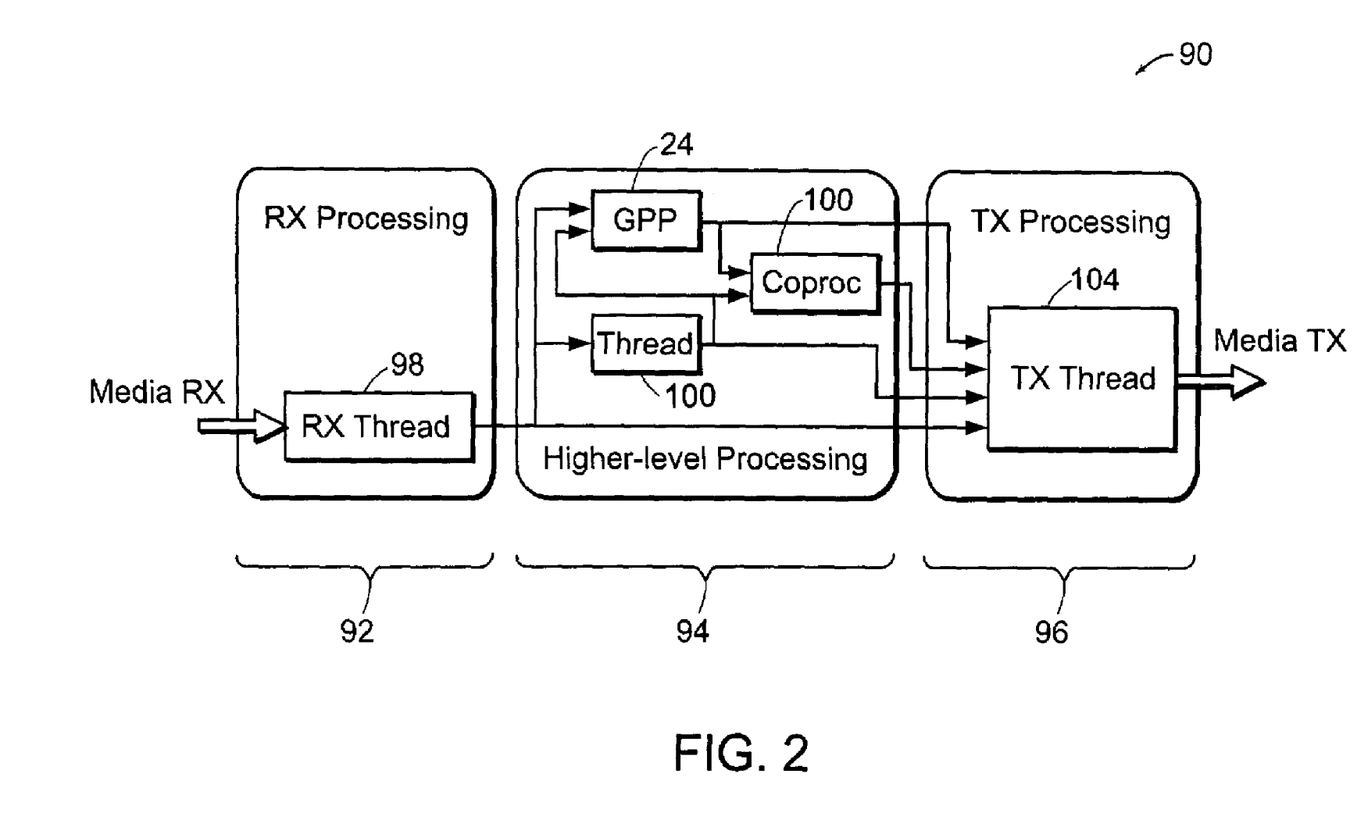
FIG. 2 is a depiction of the high-level processing flow of the processor.

Referring to FIG. 2, an exemplary software model 90 of the processor 12 is shown. The processor 12 supports three levels of processing or stages: a receive processing stage 92, a higher-level processing stage 94 and a transmit processing stage 96. In the receive processing stage, such operations as re-assembly pointer search, re-assembly information update, receive packet processing and queue management are performed. Thus, the processing during the receive processing stage begins with data arriving in a receive unit of the I/O interface media blocks and ends with storing descriptors in SRAM and moving payload data to DRAM. In the transmit processing stage, a number of functions are performed, including transmit scheduling, queue management and data transmit.

The receive thread 98 parses packet headers and performs lookups based on the packet header information. Once the packet has been processed, it is stored in DRAM 34 and is either forwarded as an exception to be further processed by the GPP 24, to another thread 100 or coprocessor 102 for higher-level processing, or is queued for transmit by placing a descriptor for it in a transmit queue associated with the transmit (forwarding port) indicated by the header/lookup. The descriptors are stored in the SRAM 38. At the transmit processing stage 96, the TX thread 104 performs the transmit data processing, that is, possibly applying a scheduling policy, possibly modifying headers, and then sending the packet out onto a forwarding port indicated by the header/lookup information during the receive processing.

Collectively, the various functions form a functional pipeline. Each stage in the functional pipeline uses multiple microengine threads 100 in parallel, and each thread in each ME is assigned a single packet for processing at any particular time.

Cells and frames generally need to be kept in order within a flow for either reassembly into frames or for transmission. Since groups of thread are used to provide parallelism and improve throughput, order is maintained by careful sequencing of cooperative threads.

Figure 3:
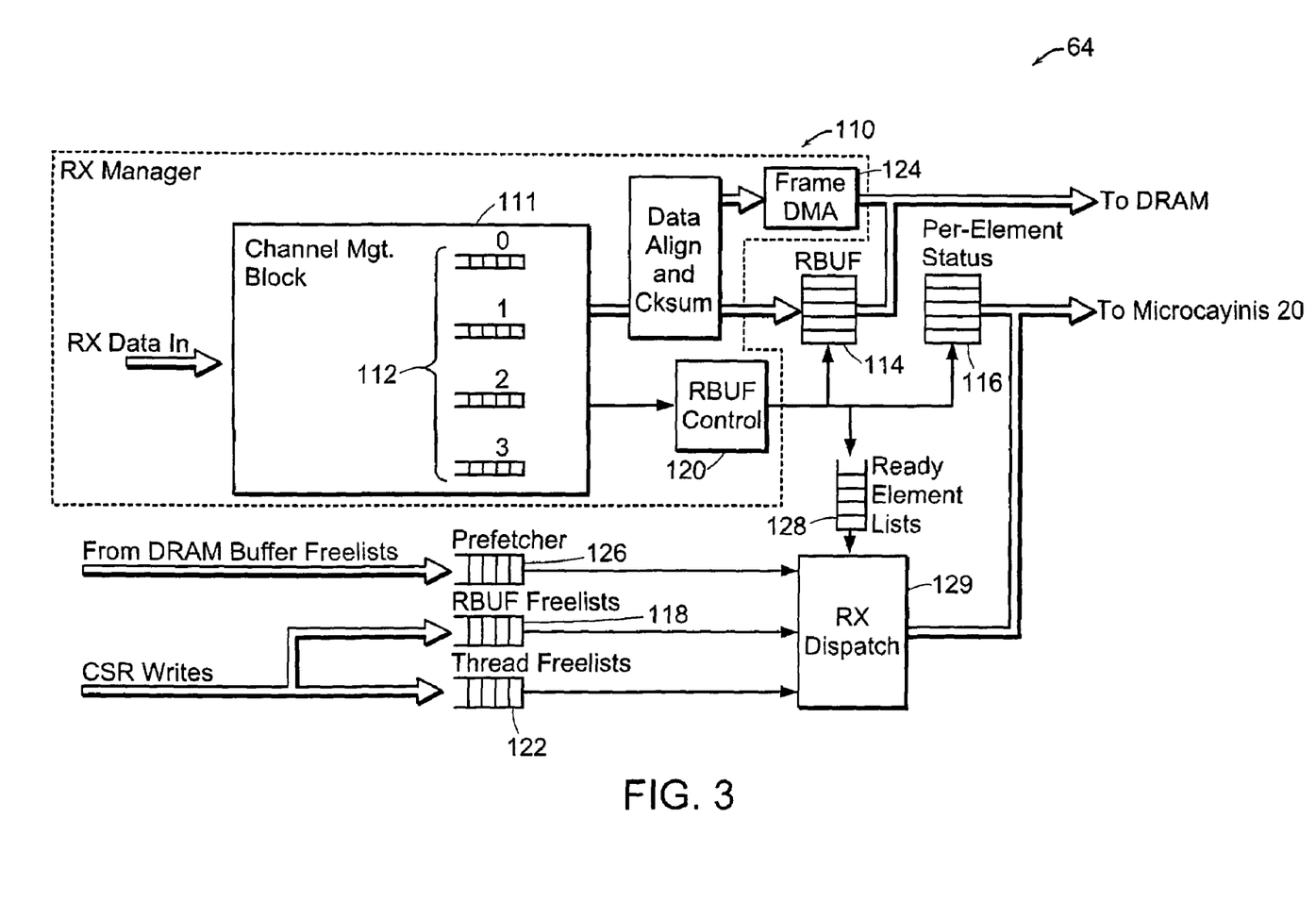
FIG. 3 is a block diagram of a receive unit of the processor.

Referring to FIG. 3, the functional units and data structures of the media block receive (RX) unit 64 are shown. This unit is replicated in the media block 0 and media block 1 of FIG. 1. The RX unit 64 includes an RX manager 110, which includes a channel management block 111 to manage multiple channels 112. The RX unit 64 also includes a receive buffer array (RBUF) 114 and an array of status 116. The status array 116 stores status context associated with each entry in the RBUF 114. Each entry is identified by an index which is delivered to an assigned RX thread as part of the RX status, and is returned by the RX thread to an RBUF freelist 118. Data is placed in RBUF 116 by an RBUF controller 120, and can be read by a thread using an instruction that specifies an offset into the array, a number of units to read, and the first transfer register into which the data is to be moved.

A thread indicates to the receive unit that it is ready to process received cells or frames by writing its thread ID into a thread freelist 122. This is done by issuing a CSR write to the thread freelist register CSR for the list it is using. The presence of the thread ID on the thread freelist 122 indicates that the thread has reserved its SRAM read transfer registers to receive the RX status words. The thread can also instruct the RX unit 64 to move data from the RBUF 116 directly to the DRAM 34.

Receive hardware assigns threads to cell or packets in the same order that the threads were enqueued onto the freelist. There can be multiple thread freelists in the receive unit, each with its own CSR addresses. Each channel in the channel management block 110 is configured to use a particular thread freelist. This allows a single freelist to serve one or multiple channels as desired by the system programmer. There can also be multiple RBUF freelists. Each channel is configured to use one of them, so each RBUF freelist 118 could serve one or several channels as desired. The RBUF controller 120 assigns an RBUF element from the RBUF freelist 118 to hold received data, and passes the RBUF number (index) to a thread as part of the receive status. Once the thread is done reading the contents of the RBUF element, it returns the entry to the RBUF freelist 118 by issuing a CSR write to the associated RBUF freelist CSR address.

The RX unit allocates the RBUF element to hold the first 64 bytes (including prepad) of a received frame or an entire cell by reading it from the RBUF freelist bound to that RX channel.

Any channel that is configured for frames automatically uses a DMA engine 124 to store the body of the frame (everything after the first 64 bytes including pad) into a buffer in DRAM 34. The data is written into a DRAM buffer starting at an offset of 64 bytes from the 64-byte aligned buffer pointer, leaving room for a processing thread to insert the edited headers at a later point.

The RX unit 64 includes a prefetcher 126 to prefetch pointers to DRAM buffers from the DRAM buffers freelist 48 in the SRAM 38. For efficiency, the pointers can be prefetched from the DRAM buffer freelist 48 in bursts. The prefetcher can also receive pointers to buffers retired by the TX unit from the TX unit directly. That is, the TX unit can recirculate retired DRAM buffers directly to the RX prefetcher 126 instead of returning them to the DRAM buffers freelist 48.

Also included is a ready-element list 128 that is used by the RRBUF controller 120 to post a cell or frame as completely received into RBUF and/or DRAM and ready for assignment to a thread, and a dispatcher 129 which does those assignments.

Each of four RX thread freelists enable groups of threads to assign themselves in FIFO order to service a port of group of ports. Each media channel is statically configured to use threads from one of these lists, and each list could be serving one or more channels. Similarly, there are four RBUF freelists into which retired RBUF entries are returned. These represent up to four closed pools of buffers assigned to a port or group of ports, with a similar static binding of each channel to one of the lists, such that a list can serve one or many channels. The RBUF pools allow system software to partition the 64 buffers as desired among different ports possibly running at radically different arrival rates. Since each media block can be partitioned into up to 4 channels, these pools allow for flexible division of resources and independent queueing among the different channels.

Figure 4:
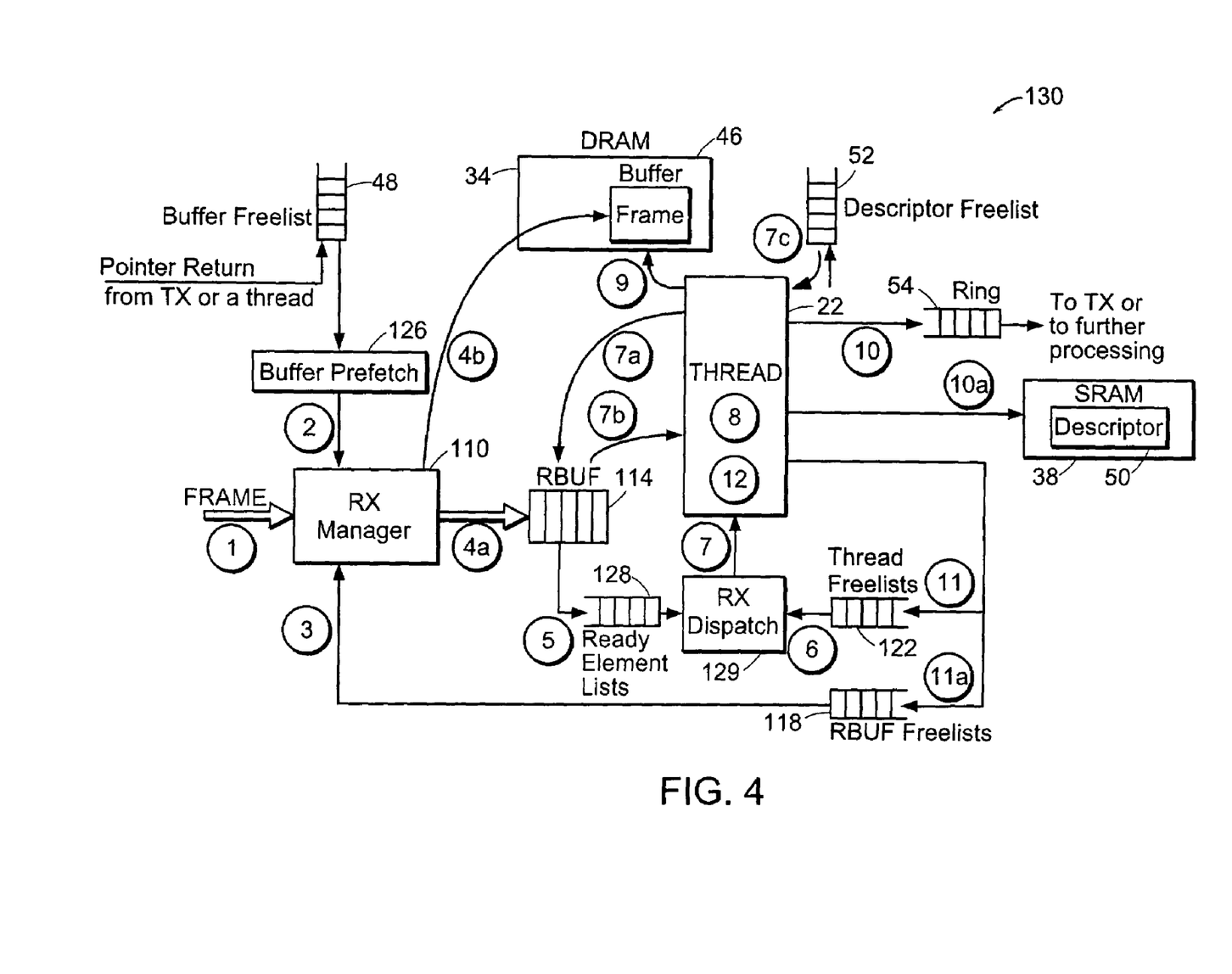
FIG. 4 is a depiction of an exemplary receive data path.

Referring to FIG. 4, an exemplary sequence of events in receiving a cell or frame 130 is as follows. The media RX interface 110 starts to receive a frame or receives a cell into its internal buffers (transaction 1, as indicated by the arrow labeled "1"). If the received data unit is a frame, the interface 110 allocates a buffer prefetched from the DRAM buffer freelist (transaction 2). It also allocates a free RBUF element from the receiving channel's RBUF freelist (transaction 3). The interface 110 moves the cell or packet from the media RX interface (transaction 4). The first 64 bytes are moved into the allocated RBUF entry (transaction 4*a*). If a frame, the remainder of the frame is written into the DRAM buffer starting at an offset of 64 bytes (transaction 4*b*). When the entire cell or frame has been received, the status is complete and the element is posted on the ready elements list for the channel (transaction 5). A thread is allocated from the channel's thread assigned freelist (transaction 6). The dispatcher pushes the status to that thread's read transfer registers (transaction 7). Status includes such information as RBUF index, frame length, media specific bits (including specific status, the VCI/VPI if a cell, and the Ethernet CRC if an Ethernet frame), the channel ID, the timestamp and the buffer pointer. The thread must also write back any non-header information that was contained in the first 64 bytes received, to complete the packet contents in DRAM.

The assigned thread issues a read of the contents of RBUF (transaction 7*a*). The thread receives the data from RBUF into the SRAM read transfer registers (transaction 7*b*). In the case of a cell, it might only read the payload since it has the VCI/VPI already. Optionally, the thread may also allocate a descriptor from the descriptor freelist for the frame (transaction 7*c*).

The thread parses the headers, executes lookups and comparisons (transaction 8). If a frame, the thread edits the headers as appropriate (transaction 8*a*). If performing a SAR of cells, the thread assembles the payload into a frame buffer, and also computes the incremental CRC for this cell (fetching, modifying and the writing back the CRC residue in progress for this frame) (transaction 8*b*). If the thread is forwarding cells, it allocates a cell buffer and writes the modified cell into it (transaction 8*c*).

If a frame, the thread must write the edited headers into the DRAM buffer to complete the frame image in DRAM (transaction 9). The headers written to the DRAM buffer could be longer, shorter or identical to the headers that were received.

If forwarding frames or cells, when a frame is complete, the thread places the buffer pointer or an associated descriptor pointer into one of the hardware-managed rings 54, thus passing it to either a TX thread, or to further processing on another thread or on the GPP 24. If a descriptor was allocated, it is filled in SRAM before it is forwarded. When done, the thread posts itself as available by writing its Thread ID to the thread freelist (transaction 11). The thread returns the RBUF element to its RBUF (transaction 11*a*). It will be appreciated that a thread could choose to return the RBUF element any time after transaction 7*b*.

Group of threads provide parallelism for processing a single stream of packets or cells coming from a channel, but need to access certain per-channel and per-flow information in sequential fashion, in arrival order for the cells or frames being processed. They also need to sequentially enqueue themselves on the freelist to maintain receive order. The sequencing among the threads is achieved through the use of sequential exclusion locks, or "s_mutexes".

The s-mutex ensures that packets or cells are processed in a particular order and that data structures sensitive to that ordering are accessed/updated accordingly.

Figure 5:
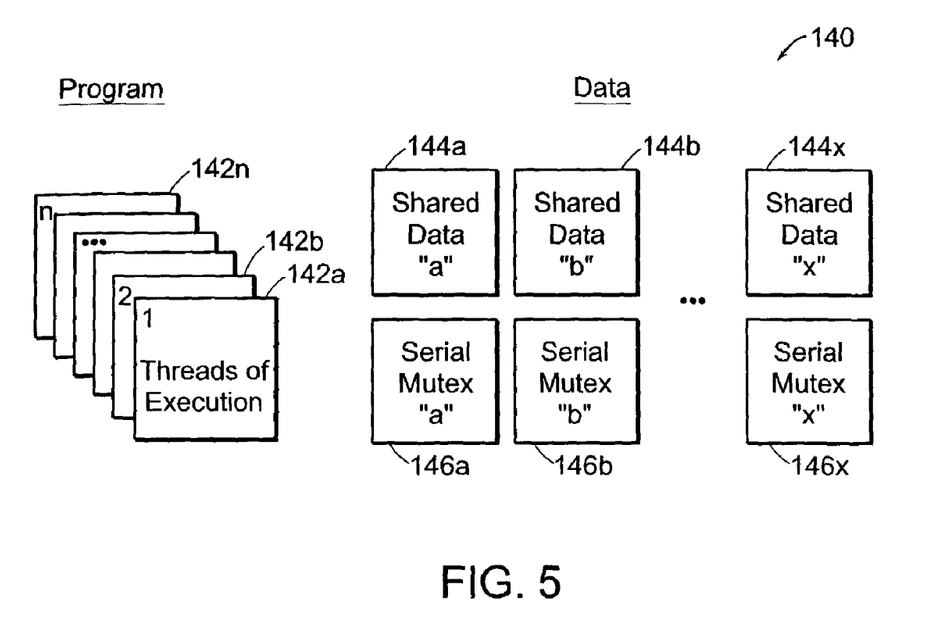
FIG. 5 is a conceptual depiction of a serialized mutual exclusion("s-mutex") mechanism employed by the threads of the processor shown in FIG. 1.

Referring to FIG. 5, an s-mutex scheme 140 for cooperative threads in a multi-threaded environment is depicted. There are multiple executions threads 142*a*, 142*b*, . . . , 142*n* and shared data items 144, shown as data items 144*a*, 144*b*, . . . , 144*x*. A data item can correspond to data stored in a single memory location, or region within memory. Associated with each shared data item 14 is a corresponding serial mutux 146, thus serial mutexes 146*a*, 146*b*, . . . 146*x*, corresponding to shared data items 144*a*, 144*b*, . . . 144*x*, respectively.

Figure 6:
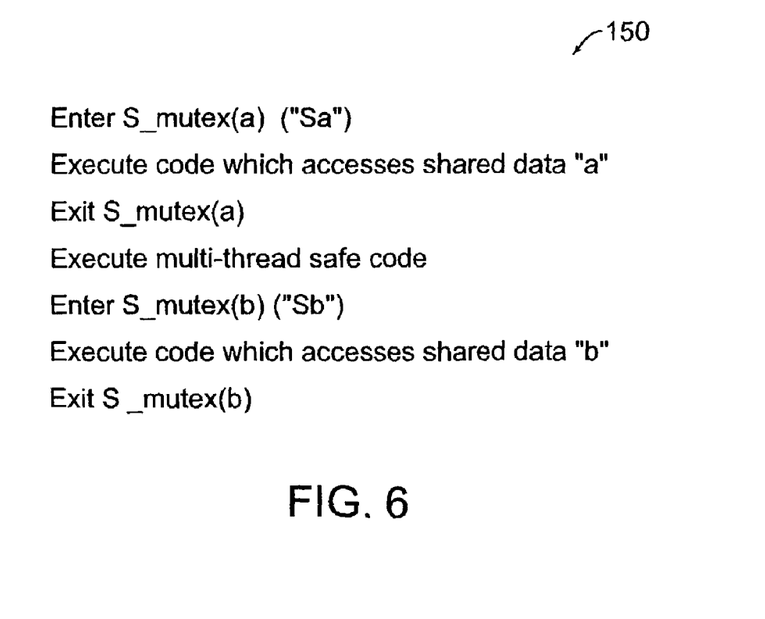
FIG. 6 is an example of code used by cooperative threads to access share data items using serialized mutual exclusion locks.

Referring to FIG. 6, a code fragment 150 used by cooperative threads is shown. In the example shown, cooperative threads are using two s-mutexes, S_mutex(a) and S_mutex(b) corresponding to shared data items "a" and "b", respectively. Each thread enters S_mutex(a) ("Sa"), executes code which accesses shared data "a", and exits S_mutex(a). The thread may execute multi-thread safe code, that is, code that does not use shared data. The thread enters S_mutex(b) ("Sb"), executes code which accesses shared data "b" and exits S_mutex(b).

Figure 7:
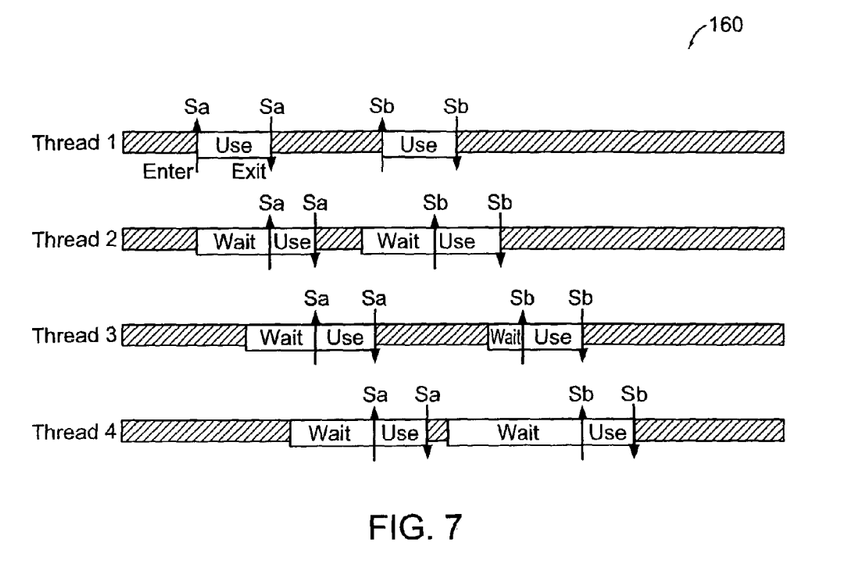
FIG. 7 is an illustration of the serialized manner in which cooperative threads access shared data items using serialized mutual exclusion locks.

Referring to FIG. 7, a timing diagram 160 illustrates the serial manner in which the cooperative threads access the shared data items "a" and "b". Even though multiple threads (in this example, four) may be waiting on a particular S_mutex ("Sa" or "Sb" in the example) concurrently, they win entry serially according to a predetermined order. It can be seen from FIG. 7 that the threads can enter "wait" in any order.

In one serialized mutex approach, ownership of a lock (and thus of the protected data) is passed from the current holder to its successor. Although many threads may be waiting to obtain ownership of the lock, a thread may only receive ownership of the lock from its assigned predecessor. Thus, in such an approach, s_mutex ownership passing can be thought of as a token-passing mechanism that uses inter-thread signaling mechanisms to pass the token from predecessor to successor. Different token-passing mechanisms can be used in an s-mutex implementation.

Figure 8:
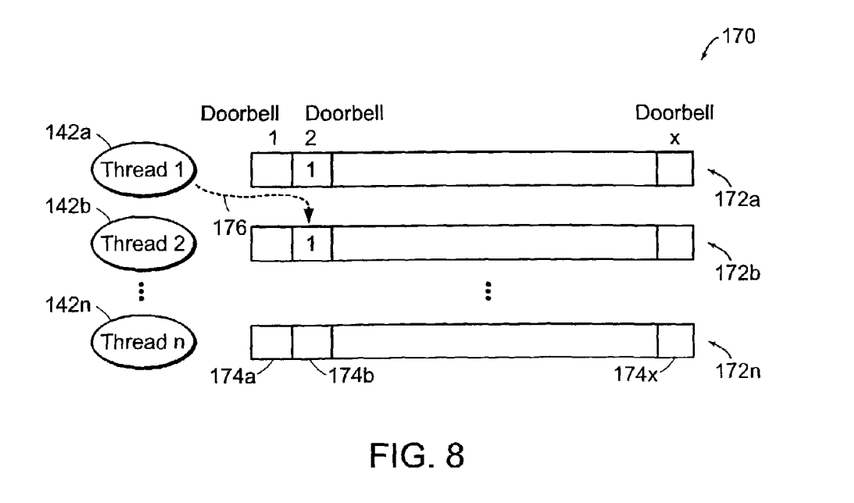
FIG. 8 is an illustration of an exemplary "token passing" implementation of the serialized ownership passing aspect of the serialized mutual exclusion lock.

FIG. 8 shows a direct processor- (or thread-) to-processor (or to-thread) signaling or "doorbell" mechanism 170. In this mechanism, there are status registers 172a, 172b, . . . 172n for each of the "n" threads. Each register 172 has "x" bits 174a, 174b, . . . , 174x, each bit corresponding to a location for receiving tokens. The locations provide signaling mechanisms, i.e. doorbells, that is, one doorbell/bit for each of "x" shared data items. For example, bit 174b corresponds to doorbell 2. A sender (predecessor) executes a "ring doorbell" instruction that specifies a thread ID of the successor thread and bit corresponding to the appropriate doorbell. The receiver (successor) polls its doorbell status register for the bit of interest, or sleeps on the event. For example, assume thread 1 enters "Sb" (corresponding to doorbell 2), does critical work and exits "Sb". When thread 1 exits, its passes a token representing the s-mutex to the next thread, for example, thread 2 according to a predetermined thread ordering for a group of cooperative threads using that s-mutex. Thread 1 rings doorbell 2 of thread 2 by causing bit 174b to be set in the doorbell status register for thread 2, register 174b (as indicated by arrow 176) to let thread 2 know that thread 2 now owns the lock. When thread 2 reaches the mutex enter for "Sb" in its code, thread 2 examines the bit 174b in doorbell status register 172b. If that bit is set, thread 2 proceeds with the work involving the data item protected by this s-mutex, or else continues to poll (waits) until it determines that the bit is set. Such a message system can reside entirely in the MEs, with the doorbell status registers located in the local CSRs, or the doorbell status registers could be located in shared hardware or in external memory. This type of token passing mechanism has relatively low latency for such token passing but limits the number of s_mutexes supported as it requires the use of dedicated hardware resources.

In an alternative inter-thread signaling implementation, a configurable to-processor (or to-thread) signal mechanism that allows any thread or processor to send one of a multiplicity of signals to any one processor (or thread) is used.

Figure 9:
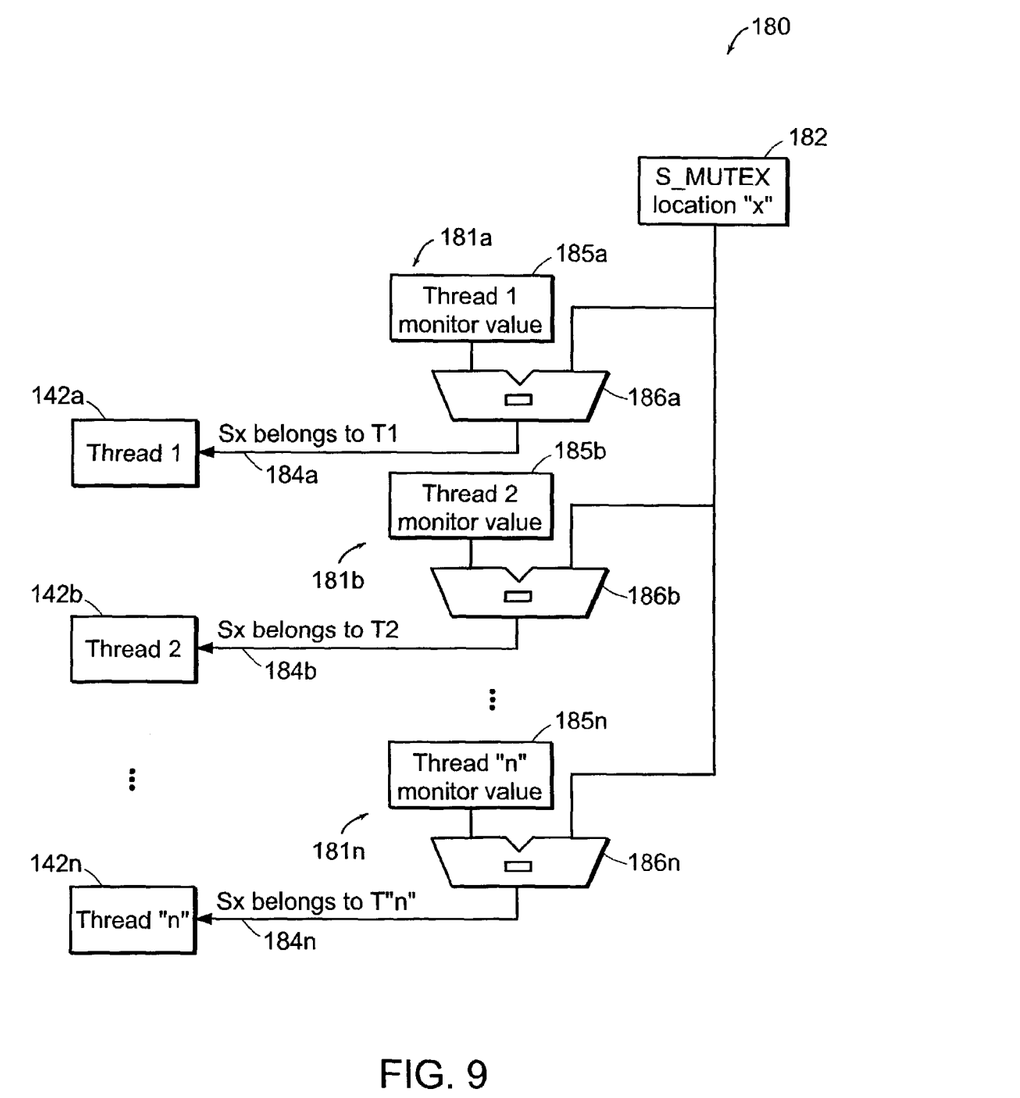
FIG. 9 is an alternative serialized mutual exclusion lock ownership-passing mechanism.

Other (non-token-passing) mechanisms may be used. For example, and as shown in FIG. 9, a hardware S-mutex monitor system or s-mutex distributor 180 provides each of "n" threads 142a, 142b, . . . , 142n, a hardware monitor 180, that is, corresponding hardware monitors 181a, 181b, . . . , 181n, on a shared location 182 for a particular s-mutex "Sx". Shared location 182 stores a thread ID for the current owner of that s-mutex. The hardware monitor 181 causes the processor/thread 142 to which it corresponds to receive a status 184 (e.g., a hardware interrupt, a thread wake-up, polling a thread, etc.), that is, 184a, 184b, . . . , 184n, for respective threads 142a, 142b, . . . , 142n when the location 182 it is waiting on is written with that thread's ID. For example, each monitor could provide a corresponding monitor value 185a, 185b, . . . , 185n to a corresponding MUX 186a, 186b, . . . , 186n, that is coupled to and receives the ID from the location 182, and enables the MUX to cause the corresponding one of the signals 184 to go active when the location contains the ID of the corresponding thread. The current owner yields the mutex to its successor by placing the ID of the successor in the s-mutex "x" location 182. In this mechanism there is one s-mutex distributor 180 for each s-mutex used by threads 142a, 142b, . . . , 142n.

The monitoring mechanism could be a centralized agent instead. The s-mutex ownership (thread ID of the current s-mutex holder) could be stored in a single register location. When passing ownership to a successor, the predecessor writes the ID of the successor to that location. All threads participating in an ordered group of threads poll this location to enter a particular s_mutex, examining its contents to determine if the stored ID matches their own. This technique provides the required ordering, but results in a large amount of memory traffic. At best it costs the latency of a memory read operation to obtain ownership of the lock.

Alternatively, a hardware register per s_mutex could be polled in a manner similar to the memory location above, but would be closer to the processors(s) and thus faster to access. Such an implementation limits the number of s_mutexes in a system to the number of hardware registers available.

As discussed earlier, a group of threads servicing one or more ports cooperate to enforce sequencing and to enable sequential consistency on shared data. The threads cooperate to enforce sequencing by using an s-mutex. A group of threads that service a port to achieve parallelism (for throughput) would enforce order when necessary, even through processing is occurring in parallel.

For example, ATM cells with a VP/VC stay in strict order. Also, TCP strongly desires that frames within a flow stay in order for performance reasons. Certain functions within the processing flow also occur sequentially for the stream of cells/frames receives, for instance, CRC residue management. A group of cooperative threads enqueues onto a thread freelist in order, thus getting assigned cells or packets in that same order from the arriving stream. In each of these instances, the s-mutex can be used to enforce ordered access to shared, order-sensitive critical code sections and also the order in which cells or packets are forwarded to the next processing agent.

Figure 10A:
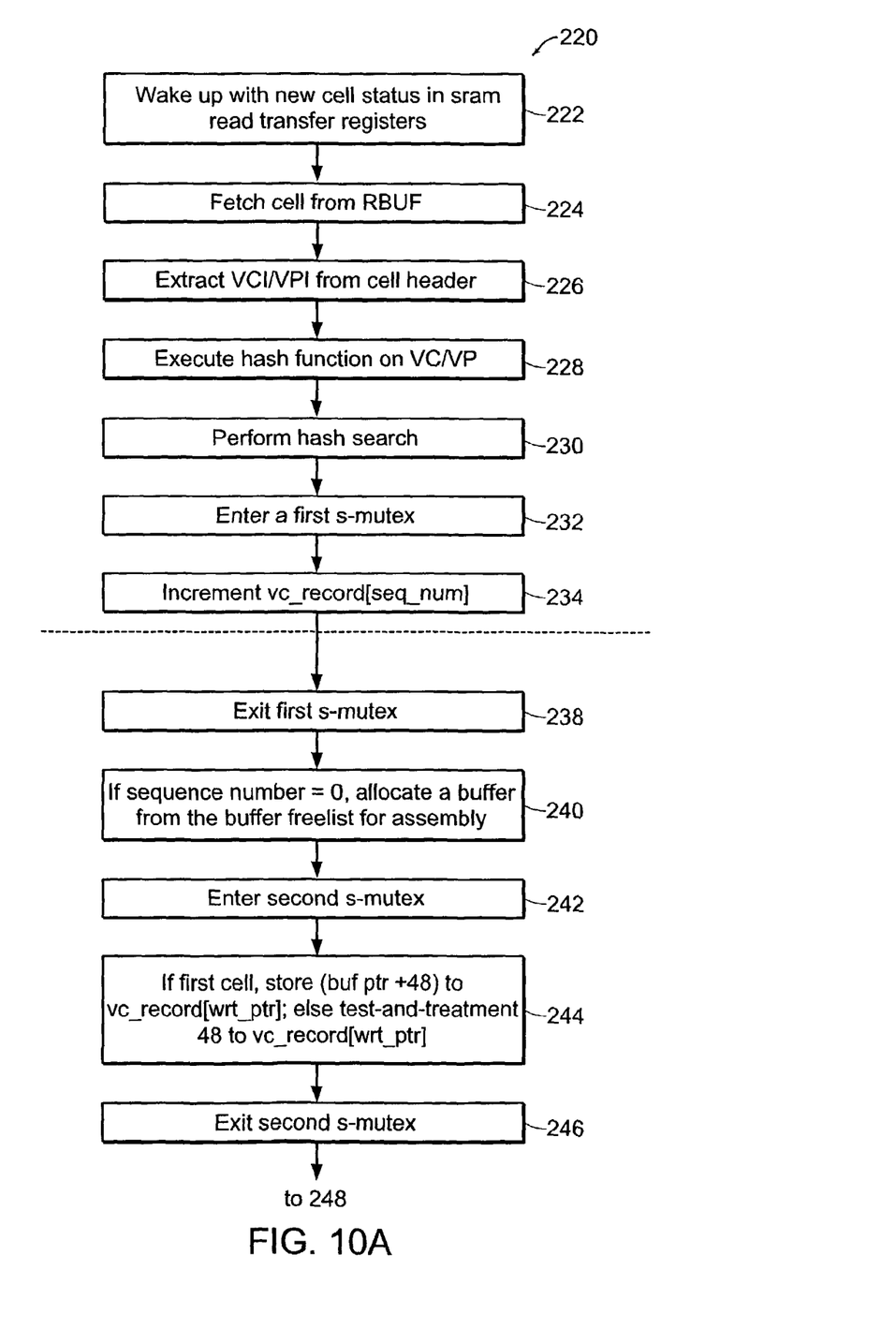
FIG. 10 is a flow diagram illustrating an exemplary use of four serialized mutual exclusion locks.
Figure 10B:
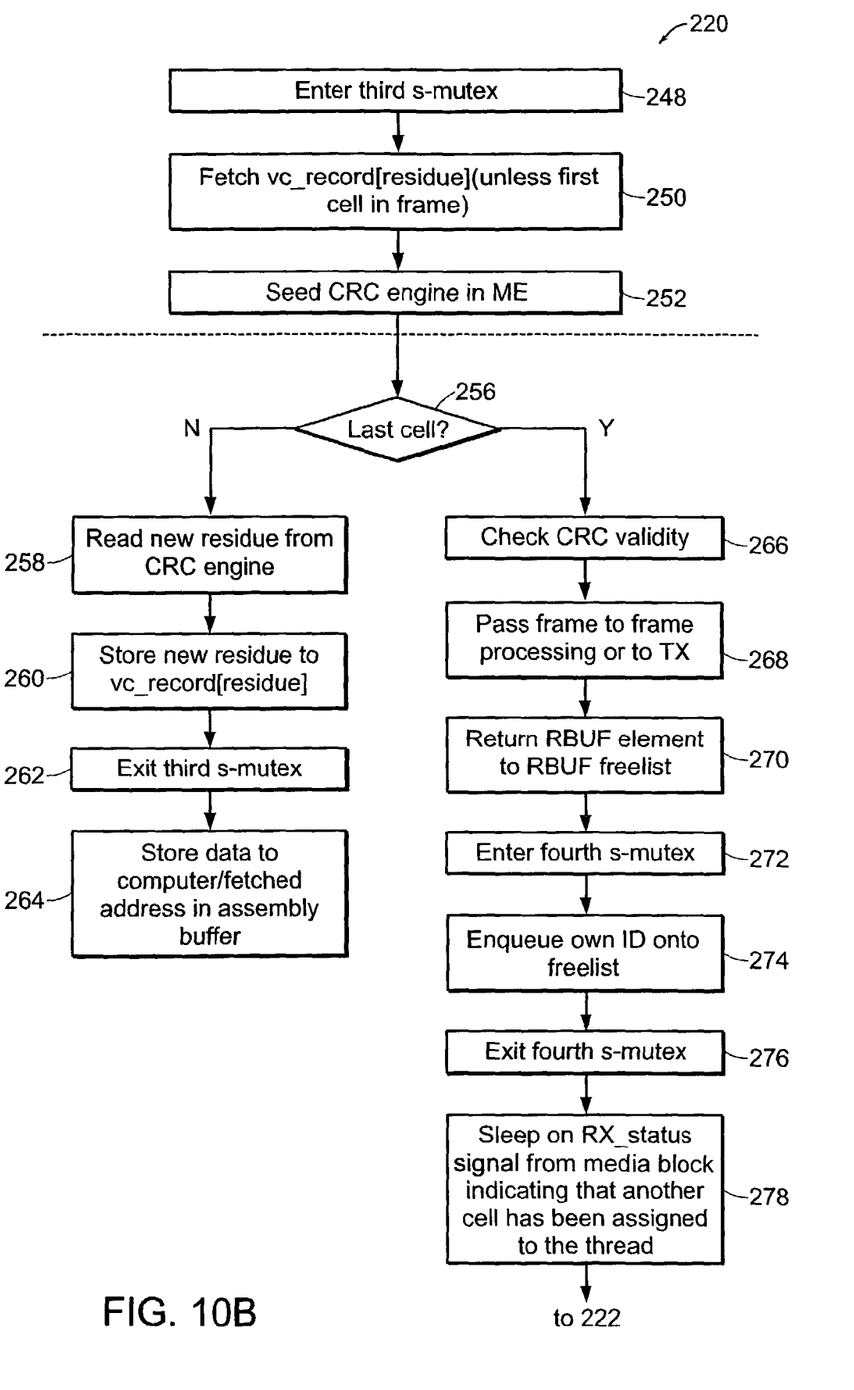

Referring to FIG. 10, an example of s-mutex usage to enable parallel processing of cells in an AAL5 frame is illustrated. In the example four different s-mutexes are used. One of the s-mutexes is used to maintain coherency of the CRC residue between the cooperative threads executing the CRC processing for cells from the same frame or packet. Each of the cells has a fragment of the frame. The verification or generation of a CRC (data integrity protection) is serialized in the order in which the cells arrived to generate the correct result. Also, the CRC computation is performed in strict order to ensure that the CRC for cells that belong to the same VC are computed with the correct CRC residue.

During an RX process 220 for an AAL5 frame, a thread performs the following tasks. When the thread wakes up, the thread finds 222 a cell status, including a DRAM buffer pointer and an RBUF number, in the microengine SRAM read transfer registers. The thread fetches 224 the cell from an RBUF entry corresponding to the RBUF number. The thread extracts 226 the VCI/VPI from the cell header and executes 228 a hash function on the VCI/VPI. The thread performs 230 a hash search of a VC table to locate a sequence number associated with the VC with which this cell is associated ("vc_record[seq_num]"). The thread enters 232 a first s-mutex, which serves to protect the sequence number while the thread is modifying the first s-mutex. Thread increments 234 the sequence number and exits 238 the first s-mutex. If the sequence number is a '0', the thread allocates 240 a buffer, more specifically, a pointer "buf ptr", from the buffer freelist for packet assembly. The thread enters a second s-mutex, which serves to protect a VC table record that stores the pointer value, "vc_record[wrt_ptr]," for the current cell. If the cell is a first cell in a packet, the thread adds 244 a value of '48' to the pointer value and records that pointer value; otherwise, it increments the currently recorded value by 48, which is the number of payload bytes carried in each ATM cell. The thread exits 246 the second s-mutex. The thread enters 248 a third s-mutex. The thread fetches 250 CRC residue stored in the VC table in record vc_record[residue] unless the cell is the first cell. The thread provides 252 the residue and CRC information from the cell to a CRC engine in the microengine for CRC computation. The thread determines 256 if the cell is the last cell. If the cell is not the last cell, the thread performs the following. The thread reads 258 the new residue from the CRC engine and stores 260 the new residue to vc_record (residue). The thread exits 262 the third s-mutex. The thread stores 264 the cell data to the computed/fetched address in the assembly buffer. If, at 256, it is determined that the cell is the last cell, the thread performs the following. The thread checks 266 the CRC validity and passes 268 the re-assembled frame to another thread or the general purpose processor for further processing, or to the TX unit for transmit. The thread returns 270 the RBUF element to the RBUF freelist. The thread enters 272 the fourth s-mutex, enqueues 274 its own thread ID onto the thread freelist, and then exits 276 the fourth s-mutex. The fourth s-mutex is the point at which threads enqueue themselves onto the thread freelist in a predetermined order so as to maintain ordered use of the other s-mutexes, thus behaving as an ordered cooperative group. The thread sleeps on a media block RX_status signal indicating that another cell has been assigned to the thread.

There are other examples of applications that would use s-mutexes. For example, during L3 forwarding, each thread can enter an s-mutex for two serialized operations: forwarding of the frame/cell to the next thread handling that flow, e.g., to transmit the frame; and placing itself back on the thread freelist in group order.

The s_mutex can be used to assist in maintaining packet and cell order, as discussed above. By providing an efficient mechanism for serialization, overheads can be reduced and throughput correspondingly increased.

Although described within the context of a multi-threaded, multi-processor network processing environment, the serialized mutex mechanism may be applicable to general multi-threaded programming applications as well.

Other embodiments are within the scope of the following claims.

What is claimed is:

1. A method comprising:
    associating a mutual exclusion lock with a shared data item; and
    repeatedly providing ownership of the mutual exclusion lock to each of three or more processing agents that execute code operating on the shared data item in a sequential order so that each processing agent receives the ownership of the mutual exclusion lock from an assigned predecessor and the order of ownership of the mutual exclusion lock by the three or more processing agents is both predetermined and repeated,
    wherein the processing agents are execution threads,
    wherein providing includes enabling each thread as a current holder of the mutual exclusion lock to pass ownership of the mutual exclusion lock to a successor according to the sequential order,
    wherein enabling comprises using inter-thread signaling resources to signal to the successor that the successor owns the mutual exclusion lock,
    wherein the inter-thread signaling resources comprise status registers that store ownership status of the mutual exclusion lock for each of the execution threads.

2. The method of claim 1 wherein the code executed by the execution threads processes units of packet data received from a network and the sequential order maintains correct ordering of the units of packet data.

3. The method of claim 2 wherein maintains correct ordering comprises maintaining end-point to end-point order of forwarded network packets.

4. The method of claim 1 wherein the code executed by the execution threads processes units of packet data received from a network and the sequential order maintains correct ordering of processing of the units of packet data.

5. The method of claim 1 wherein the code is used to perform receive processing on asynchronous transfer mode (ATM) cells belonging to a packet including a cyclic redundancy check (CRC) computation, the shared data item is a CRC computation value stored in a storage location and the sequential order maintains the order in which the storage location is accessed during the CRC computation.

6. The method of claim 5, wherein the CRC computation value is a CRC residue.

7. The method of claim 5 wherein the code executed by the execution threads is used to perform receive processing on asynchronous transfer mode (ATM) cells and the shared data item is a sequence number.

8. The method of claim 1 wherein enabling further comprises:
    storing by each thread as a current holder of the mutual exclusion lock an associated identifier in a location, such thread storing an identifier associated with a successor when the thread releases the mutual exclusion lock.

9. The method of claim 8 wherein providing comprises:
    enabling each of the threads to receive a status indicative of ownership of the mutual exclusion lock.

10. The method of claim 8 wherein enabling further comprises:
    polling of the location by the other threads to determine if the stored identifier matches that of the polling threads.

11. The method of claim 8 wherein storing of the identifier associated with the successor causes a status to be sent to the successor.

12. The method of claim 8 wherein enabling further comprises:
    triggering a wakeup of a thread which is sleeping on that status.

13. The method of claim 1 wherein the inter-thread signaling resources further comprise status indications to the threads indicating that a thread has been made owner of a mutual exclusion lock.

14. The method of claim 1 further comprising repeatedly entering a series of mutual exclusion locks, ownership of each of which is provided to each of the three or more processing agents in the predetermined order, with ownership being received by each processing agent from the assigned predecessor from which the processing agent had received the ownership of a mutual exclusion lock in the previous series.

15. An article comprising:
    a storage medium having stored thereon instructions that when executed by a machine result in the following:
    associating a mutual exclusion lock with a shared data item; and repeatedly providing ownership of the mutual exclusion lock to each of multiple execution threads that execute code operating on the shared data item in a sequential order so that each processing agent receives the ownership of the mutual exclusion lock from an assigned predecessor and the order of ownership of the mutual exclusion lock by the three or more processing agents is both predetermined and repeated, wherein the code is used to perform receive processing on asynchronous transfer mode (ATM) cells belonging to a packet including a cyclic redundancy check (CRC) computation, the shared data item is a CRC computation value stored in a storage location and the sequential order maintains the order in which the storage location is accessed during the CRC computation.

16. The article of claim 15 wherein the code executed by the execution threads is used to process units of packet data received from a network and the sequential order maintains correct ordering of the units of packet data.

17. The article of claim 15 wherein the code executed by the execution threads is used to process units of packet data received from a network and the sequential order maintains correct ordering of the processing of units of packet data.

18. The article of claim 15 wherein:
a first processing agent is the assigned predecessor of a second processing agent; and
providing the ownership of the mutual exclusion lock comprises making the second processing agent that enters a wait state prior to the first processing agent entering a wait state wait to receive the ownership of the mutual exclusion lock from the first processing agent.

19. The article of claim 15 wherein execution of the instructions stored on the storage medium having stored thereon further results in:
associating a second mutual exclusion lock with a second shared data item; and
providing ownership of the second mutual exclusion lock in the sequential order to each of the three or more processing agents so that each processing agent receives the ownership of the second mutual exclusion lock from the assigned predecessor from which the processing agent had received the ownership of the mutual exclusion lock, and the order of ownership of the second mutual exclusion lock is the same as the order of ownership of the mutual exclusion lock.

20. The article of claim 15 wherein execution of the instructions stored on the storage medium having stored thereon further results in repeatedly entering a series of mutual exclusion locks, ownership of each of which is provided to each of the three or more processing agents in the predetermined order, with ownership being received by each processing agent from the assigned predecessor from which the processing agent had received the ownership of a mutual exclusion lock in the previous series.

21. The article of claim 15 wherein:
the processing agents are execution threads; and
the code is used to perform receive processing on asynchronous transfer mode (ATM) cells belonging to a packet including a cyclic redundancy check (CRC) computation, the shared data item is a CRC computation value stored in a storage location and the sequential order maintains the order in which the storage location is accessed during the CRC computation.

22. The article of claim 21 wherein the CRC computation value is a CRC residue.

23. The article of claim 21 wherein the code executed by the execution threads is used to perform receive processing on asynchronous transfer mode (ATM) cells and the shared data item is a sequence number.

24. An apparatus comprising:
a processor that includes three or more processing agents that access a shared data item; and
a storage device that stores executable code to identify which of the three or more processing agents has ownership of a mutual exclusion lock, wherein the executable code comprises instructions to cause the processor to:
change information accessible to the processing agents to reflect passage of ownership of the mutual exclusion lock from one of the processing agents as a current owner to another one of the processing agents as a successor in a sequential manner so that each successor processing agent repeatedly receives the ownership of the mutual exclusion lock from an assigned predecessor processing agent and the order of ownership of the mutual exclusion lock by the three or more processing agents is both predetermined and repeated; and
convey that the information has been changed to at least the successor;
wherein the processing agents are execution threads,
wherein the code is used to perform receive processing on asynchronous transfer mode (ATM) cells belonging to a packet including a cyclic redundancy check (CRC) computation, the shared data item is a CRC computation value stored in a storage location and the sequential order maintains the order in which the storage location is accessed during the CRC computation.

25. The apparatus of claim 24 wherein the code executed by the execution threads processes units of packet data received from a network and the sequential order maintains correct ordering of the units of packet data.

26. The apparatus of claim 25 wherein maintains correct ordering comprises maintaining end-point to end-point order of forwarded network packets.

27. The apparatus of claim 24 wherein the code executed by the threads is used to process units of packet data received from a network and the sequential order maintains correct ordering of the units of packet data.

28. The apparatus of claim 24 wherein the code executed by the execution threads processes units of packet data received from a network and the sequential order maintains correct ordering of processing of the units of packet data.

29. The apparatus of claim 24 wherein the CRC computation value is a CRC residue.

30. The apparatus of claim 24 wherein providing comprises:
enabling each thread as a current holder of the mutual exclusion lock to pass ownership of the mutual exclusion lock to a successor according to the sequential order.

31. The apparatus of claim 30 wherein enabling comprises using inter-thread signaling resources to signal to the successor that the successor owns the mutual exclusion lock.

32. The apparatus of claim 31 wherein the inter-thread signaling resources comprise status registers that store ownership status of the mutual exclusion lock for each of the threads.

33. The apparatus of claim 31 wherein the inter-thread signaling resources further comprise status indications to the threads indicating that a thread has been made owner of a mutual exclusion lock.

34. The apparatus of claim 30 wherein enabling farther comprises:
storing by each thread as a current holder of the mutual exclusion lock an associated identifier in a location, such thread storing an identifier associated with a successor when the thread releases the mutual exclusion lock.

35. The apparatus of claim 34 wherein providing comprises:
enabling each of the threads to receive a status indicative of ownership of the mutual exclusion lock.

36. The apparatus of claim 34 wherein enabling further comprises:
polling of the location by the other threads to determine if the stored identifier matches that of the polling threads.

37. The apparatus of claim 34 wherein storing of the identifier associated with the successor causes a status to be sent to the successor.

38. The apparatus of claim 34 wherein enabling further comprises:
triggering a wakeup of a thread which is sleeping on that status.

39. A method comprising:
associating a mutual exclusion lock with a shared data item; and
providing ownership of the mutual exclusion lock to each of three or more processing agents that execute code operating on the shared data item in a sequential order so that each processing agent receives the ownership of the mutual exclusion lock from an assigned predecessor and the order of ownership of the mutual exclusion lock by the three or more processing agents is both predetermined and repeated,
wherein:
a first processing agent is the assigned predecessor of a second processing agent; and
providing the ownership of the mutual exclusion lock comprises making the second processing agent that enters a wait state prior to the first processing agent entering a wait state wait to receive the ownership of the mutual exclusion lock from the first processing agent,
wherein the processing agents are execution threads,
wherein providing includes enabling each thread as a current holder of the mutual exclusion lock to pass ownership of the mutual exclusion lock to a successor according to the sequential order,
wherein enabling comprises using inter-thread signaling resources to signal to the successor that the successor owns the mutual exclusion lock,
wherein the inter-thread signaling resources comprise status registers that store ownership status of the mutual exclusion lock for each of the execution threads.

40. A method comprising:
associating a first mutual exclusion lock with a first shared data item;
providing ownership of the first mutual exclusion lock to each of three or more processing agents that execute code operating on the first shared data item in a sequential order so that each processing agent receives the ownership of the first mutual exclusion lock from an assigned predecessor and the order of ownership of the first mutual exclusion lock by the three or more processing agents is predetermined;
associating a second mutual exclusion lock with a second shared data item; and
providing ownership of the second mutual exclusion lock to each of the three or more processing agents in the sequential order so that each processing agent receives the ownership of the second mutual exclusion lock from the assigned predecessor from which the processing agent had received the ownership of the first mutual exclusion lock, and the order of ownership of the second mutual exclusion lock is the same as the order of ownership of the first mutual exclusion lock,
wherein the processing agents are execution threads,
wherein the code is used to perform receive processing on asynchronous transfer mode (ATM) cells belonging to a packet including a cyclic redundancy check (CRC) computation, the shared data item is a CRC computation value stored in a storage location and the sequential order maintains the order in which the storage location is accessed during the CRC computation.

41. The method of claim 40 wherein the CRC computation value is a CRC residue.

42. The method of claim 40 wherein the code executed by the execution threads is used to perform receive processing on asynchronous transfer mode (ATM) cells and the shared data item is a sequence number.

* * * * *